E. UPTON.
POWER TRANSMISSION GEARING.
APPLICATION FILED JUNE 12, 1912.

1,059,788.

Patented Apr. 22, 1913.

3 SHEETS—SHEET 1.

Witnesses:
Robert H. Weir
Leo J. Outman

Inventor
Emory Upton
by Foree Bain & May
Attys

E. UPTON.
POWER TRANSMISSION GEARING.
APPLICATION FILED JUNE 12, 1912.

1,059,788.

Patented Apr. 22, 1913.

3 SHEETS—SHEET 2.

Witnesses:

Inventor
Emory Upton

E. UPTON.
POWER TRANSMISSION GEARING.
APPLICATION FILED JUNE 12, 1912.
1,059,788.
Patented Apr. 22, 1913.
3 SHEETS—SHEET 3.
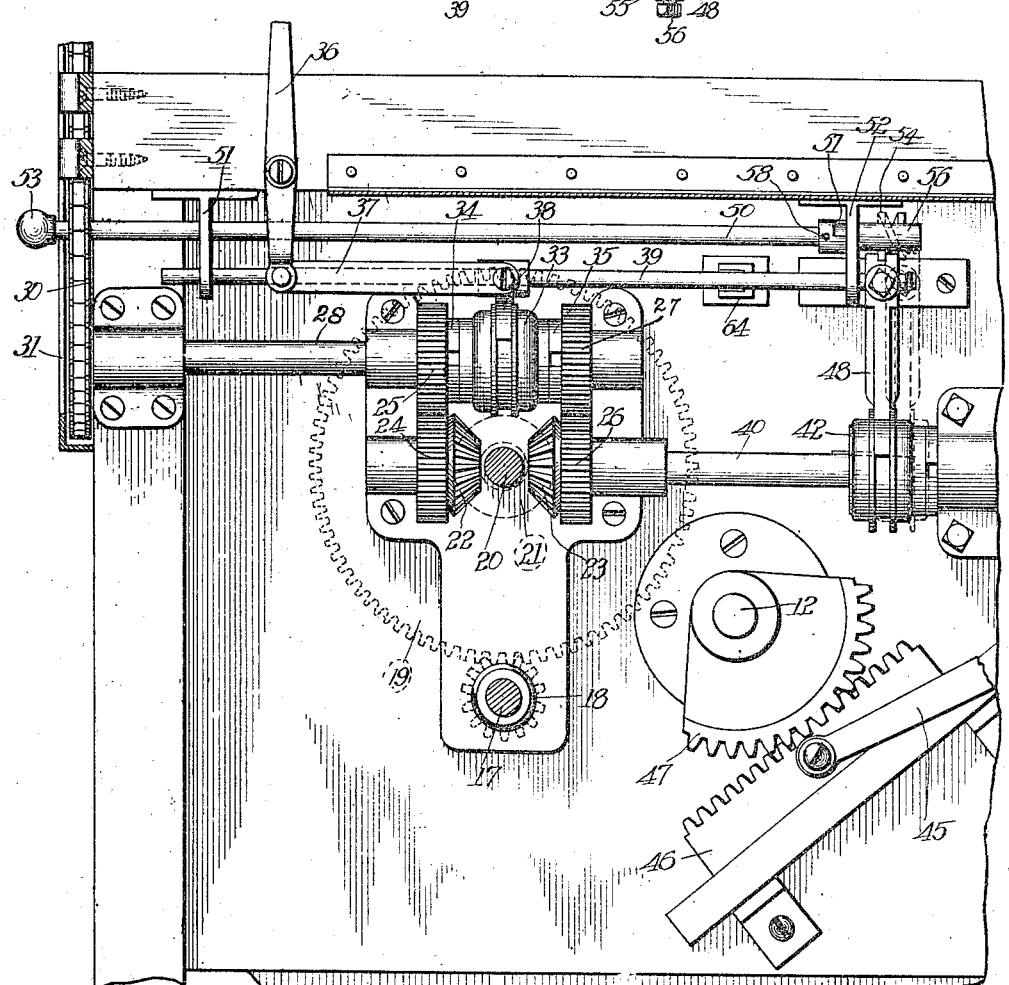

UNITED STATES PATENT OFFICE.

EMORY UPTON, OF BENTON HARBOR, MICHIGAN, ASSIGNOR TO UPTON MACHINERY COMPANY, OF ST. JOSEPH, MICHIGAN, A CORPORATION OF MICHIGAN.

POWER-TRANSMISSION GEARING.

1,059,788.  Specification of Letters Patent.  Patented Apr. 22, 1913.

Application filed June 12, 1912. Serial No. 703,109.

*To all whom it may concern:*

Be it known that I, EMORY UPTON, a citizen of the United States, residing at Benton Harbor, in the county of Berrien and State of Michigan, have invented certain new and useful Improvements in Power-Transmission Gearing, of which the following is a specification.

My invention relates to power transmission gearing.

One of the salient objects of my invention is to provide a power transmission gearing that is especially well adapted for use in operating a clothes-laundry, or washing machine.

The particular improvement, to be disclosed and claimed in this application, consists in means employed for positively restraining the oscillating movement of the clothes-holding receptacle operated at the same time, and by the same instrumentality by which the power transmitting means, for operating said receptacle, is disconnected therefrom.

Figure 1:
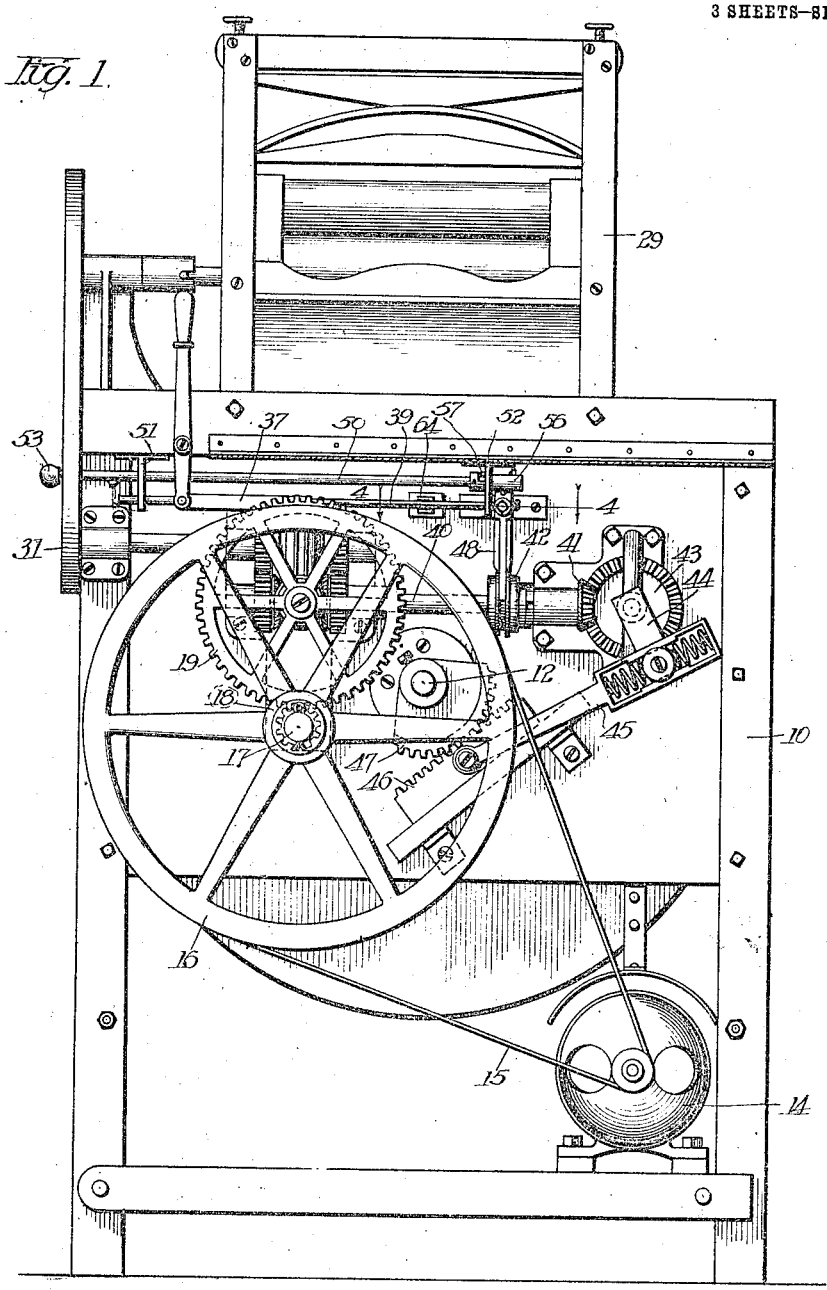
Figure 2:
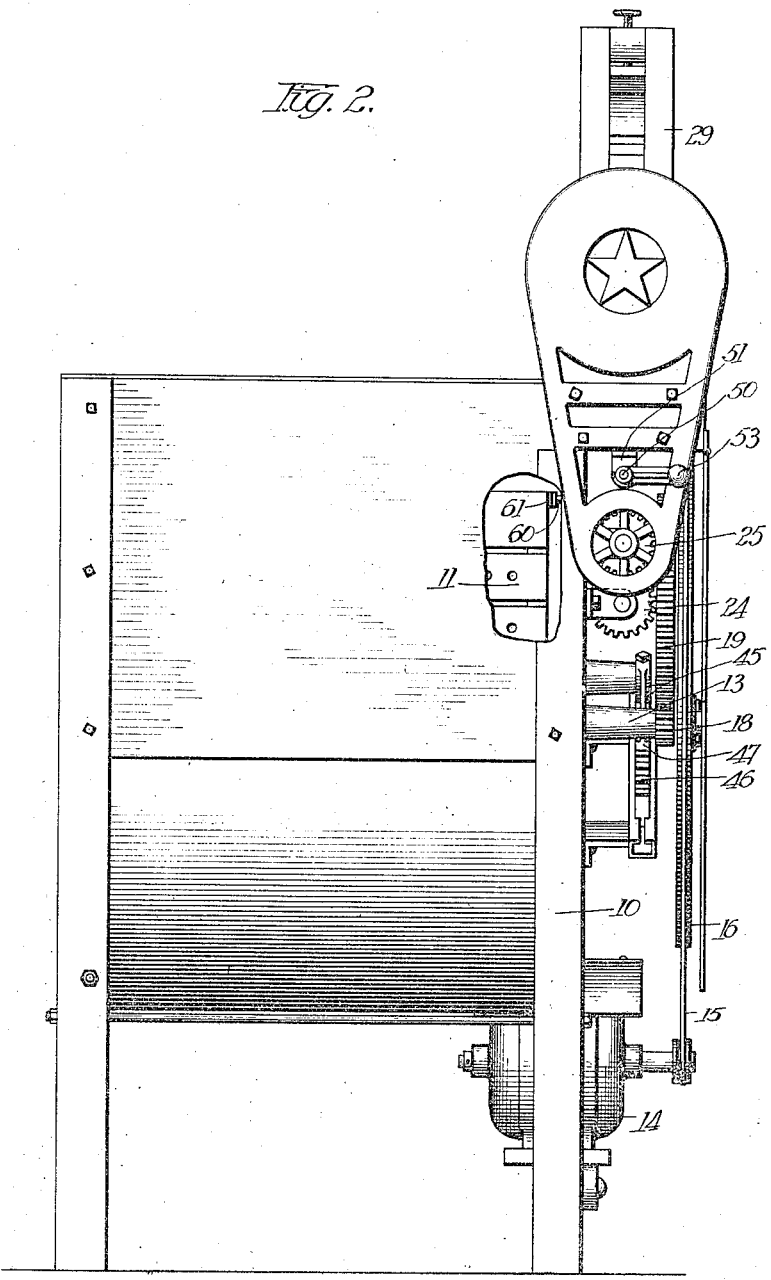

Other and further objects of my invention will become readily apparent to persons skilled in the art from a consideration of the following description when taken in conjunction with the drawings, wherein:

Figure 1 is a front elevation of a laundry machine, showing my power transmitting gearing connected therewith and supported thereon; Fig. 2 is a side elevation of the same, showing a part broken away; Fig. 3 is an enlarged view of a portion of Fig. 1; Fig. 4 is a section taken on line 4—4 of Fig. 1.

In all the views the same reference characters are used to indicate similar parts.

I will specifically point out the particular part or parts, that are of present interest and form the subject matter of this application.

10 is a frame of the clothes washing machine inclosing therein the clothes receptacle, 11, which is adapted to be operated by the associated power transmitting gearing, and which is supported on an axial shaft 12 having a bearing provided in the projecting boss 13.

14 is a source of power, shown in this particular instance as an electric motor, connected by belt 15 with the pulley 16. The pulley 16 is secured to the shaft 17 which carries the spur pinion 18. The pinion 18 meshes into, and has driving relation, with the gear wheel 19. The gear wheel 19 is secured, or fixed, to the shaft 20 and this latter shaft carries a miter gear 21, shown in dotted lines in Fig. 3, which has driving relation with a miter gear on either side thereof indicated by 22 and 23 respectively.

The bevel gear 22 has driving relation with two intermeshing spur gears 24 and 25, and the bevel gear 23 has driving relation with two spur gears 26 and 27.

The shaft 28, is adapted to operate a wringer 29, located on the upper portion of the laundry machine, driven by a chain 30, inclosed in a casing 31.

A sliding clutch member 33 is rotatably secured to shaft 28, and coacting members 34 and 35 are connected with the gear wheels 25 and 27 respectively which are loose on said shaft. The object of this latter construction is to rotate the wringer in either direction. When the sliding member is pushed to the right hand side it engages the clutch member 35 and the shaft 28 is rotated by the spur gear wheel 27, and the wringer will be rotated in a given direction. Now, if the sliding member 33 be moved in the opposite direction, so as to engage the clutch member 34, connected to the spur gear 25, the shaft 28 will be driven in the opposite direction, and the wringer will be rotated in an opposite direction. The clutch moving member 33 is operated by a lever 36 connected thereto by means of a link 37 and a yoke 38, the latter finding sliding bearing upon the rod 39.

A shaft 40 is adapted to drive the oscillating clothes receptacle 11, and it is connected to the bevel pinion 41 by means of a clutch at 42. The pinion 41 drives a bevel gear 43 which rotates a crank arm 44. By means of the pitman 45, connected to the sliding rack 46 which meshes in the quadrant gear member 47, the shaft 12, carrying the clothes receptacle 11 is oscillated.

An arm 48 when laterally moved causes engagement of the sliding member of the clutch 42 to connect or disconnect the shaft 40 from the bevel pinion 41.

A shaft 50 is supported by brackets 51 and 52. A handle, 53, is adapted to oscillate, or partially rotate the shaft 50, to the extent of about one-half revolution for the purpose of operating the clutch 42.

On the end of the shaft 50 is secured a worm, or screw, 54, the threads of which mesh in a notch 55 made in the upper end of the arm 48 so that when the shaft 50 is rotated, or oscillated, the arm 48 is moved laterally, on shaft 39, and together therewith the slidable engaging and disengaging element of the clutch 42, as shown in dotted lines in Fig. 3, whereby the shaft 40 may be connected or disconnected from the pinion 41 and thereby the oscillating shaft 12, or clothes receptacle may be connected or disconnected from the shaft 40.

The rod 39 is connected to the arm 48, by a screw 56 and has slidable bearing in the brackets 51 and 52.

A stop 57 is connected to bracket 52 and in conjunction with a shoulder, provided on the sleeve 58, is a means for limiting the rotary movement of the shaft 50. When the shaft 50 has been rotated, within the limits prescribed, the arm 48 will have been moved in either direction, to the extent indicated by the dotted and full lines in Fig. 3, and the clutch 42 will thereby be connected and disconnected with the part of the gearing that is necessary to oscillate the clothes receptacle which is supported on the shaft 12.

The clothes receptacle, when in operation, moves through an angle of about 90 degrees, and it frequently happens that the opening, in which the clothes are inserted into the receptacle, is stopped at one side, or the other, so that it becomes necessary for the operator to move the receptacle over, so that opening will be possible and it sometimes happens that the clothes receptacle, being entirely disconnected from the operating machinery, is not in stable position, and is liable to turn over and empty the clothes after they have been placed therein. It therefore, becomes greatly desirable to provide some means that will hold the receptacle in the proper position and prevent these disadvantages. I therefore, provide a pin 60, which takes through the wall 10, and engages a cleat 61 that is secured to the oscillable receptacle 11.

When the pin 60 engages the cleat, the receptacle 11 cannot be operated, and will always be held in a given, definite, unyielding position greatly to be desired.

The pin 60, is pivotally secured to a lever 63, as at 64, and the lever is pivoted to a bracket 65, as at 66. The outer end of the lever is turned outwardly as 67 within the path of the arm 48 when the arm is moved to dotted line position, for causing the clutch 42 to connect the shaft 40 with the bevel pinion 41, so that when the arm is moved in that direction it engages the outer end of the lever 67 and causes the pin to be moved out of connection with the cleat 61 that is secured to the clothes receptacle, and thereby the pin is withdrawn from the operating path of the receptacle. A spring 68, engages a lug 69, and returns the lever 63, and pin 60, when the arm 48 is withdrawn from engagement with the out turned end 67, as when power is disconnected from the clothes receptacle. The cleat 61 is tapered on each side of the notch 62, and the pin is yieldingly held inwardly, by the spring 68, so that the pin will snap into the notch when the receptacle is moved to proper position and thus the receptacle will be latched and held in stationary position during the time when power is not applied thereto.

Having thus described my invention, what I claim is:

1. In a device of the character described, a part to be oscillated, a source of power, intermediate gearing to transmit power therefrom to said oscillatable part, said gearing comprising in part a clutch to disconnect said oscillatable part, means for operating said clutch, and means for positively stopping the motion of said oscillatable part, after being disconnected from said source of power, operable by said clutch operating means.

2. In a device of the character described, a part to be oscillated, a supporting wall for said oscillatable part, a source of power, intermediate gearing to transmit power therefrom to said oscillatable part, supported on the other side of said wall, said gearing comprising in part a clutch having a slidable part to disconnect said oscillatable part, means for operating the slidable part of said clutch, and a stop pin taking through said wall to engage said oscillatable part when the latter said part is disconnected from the source of power, operable by said clutch operating means.

3. In a device of the character described, a part to be oscillated, a source of power, a gearing connecting said part and said source of power, said gearing comprising in part a clutch for effecting said connection, a positive stop adapted to be inserted in the path of the part to be oscillated to prevent the motion, and means for simultaneously operating said clutch and said stop.

In testimony whereof I hereunto set my hand in the presence of two witnesses.

EMORY UPTON.

In the presence of—
 FRED R. BELKNAP,
 R. W. BAKER.